United States Patent
Hino et al.

(10) Patent No.: US 7,424,611 B2
(45) Date of Patent: Sep. 9, 2008

(54) AUTHENTICATION SYSTEM AND METHOD

(75) Inventors: Akira Hino, Sagamihara (JP); Eitaroh Kasamatsu, Sagamihara (JP); Akiyoshi Tanaka, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1250 days.

(21) Appl. No.: 10/378,394

(22) Filed: Mar. 3, 2003

(65) Prior Publication Data

US 2003/0221114 A1    Nov. 27, 2003

(30) Foreign Application Priority Data

Mar. 8, 2002    (JP) ............................. 2002-064368

(51) Int. Cl.
*H04L 9/00*    (2006.01)
(52) U.S. Cl. ...................................... 713/167
(58) Field of Classification Search ........................ None
See application file for complete search history.

(56) References Cited

U.S. PATENT DOCUMENTS

| | | | |
|---|---|---|---|
| 6,401,208 B2 * | 6/2002 | Davis et al. ................. | 713/193 |
| 6,920,553 B1 * | 7/2005 | Poisner ......................... | 713/2 |
| 2003/0084285 A1 * | 5/2003 | Cromer et al. .............. | 713/164 |

* cited by examiner

*Primary Examiner*—Emmanuel L Moise
*Assistant Examiner*—David J Pearson
(74) *Attorney, Agent, or Firm*—Carlos Munoz-Bustamante; Dillon & Yudell LLP

(57) ABSTRACT

Preventing malicious code from reading an authenticator and being falsely authenticated using the read authenticator. Authenticator accepting period detection means detects an authenticator accepting period during which inoperativeness of all unauthenticated programs is guaranteed. Program executing means transmits its authenticator only during the authenticator accepting period. After authentication means is authenticated as genuine, the authentication means computes a one-way function value of the authenticator received from the program executing means and compares the one-way function value X with a stored value Y for the program executing means. If X=Y, then the authentication means authenticates the program executing means.

7 Claims, 6 Drawing Sheets

AUTHENTICATION SYSTEM AND METHOD

TECHNICAL FIELD

The present invention relates to electrical apparatuses such as a personal computer (hereinafter referred to as "PC" if necessary), and authentication systems, firmware devices and authentication methods incorporated into the electrical apparatuses. More particularly, it relates to electrical apparatuses that precisely prevent leakage of an authenticator, and authentication systems, firmware devices and authentication methods incorporated into the electrical apparatuses.

BACKGROUND OF THE INVENTION

It is known that, in a LAN (Local Area Network) or WAN (Wide Area Network), a user typically inputs a password at login to be authenticated by a specific server. Then, the authenticating server, which does not hold a password itself, computes a hash function value of the input password and compares the computed value with a certain stored value associated with the user to determine whether to authenticate the user. In such an authentication system, the value associated with the user and stored in the server is not a password itself to be input by the user but is a hash function value of the password, and the hash function cannot be reverse-operated. Therefore, even if such a hash function value leaks from the server, the hash function value cannot be used for authentication. Thus, unauthenticated login attempts can be prevented.

Conventional authentication systems employing a hash function have problems when, for example, they are applied to authentication of a PC's firmware for controlling power-saving mode. For example, a computer virus that invades a PC may access an object to be authenticated that has an authenticator from which a hash function is generated, rather than accessing an authenticating entity that has a hash function value, and may successfully read the authenticator.

Further, a firmware program that may be authenticated is executed by a dedicated processor separate from a processor for executing an OS of the PC, and various programs executed on the processor for executing the OS generally cannot read the content of the firmware program. Therefore, the processor for executing the OS cannot read the code of the firmware program to determine whether to authenticate the firmware program based on the content.

The object of the invention is to provide an authentication system, firmware device, electrical apparatus, and authentication method for performing authentication based on an authenticator for generating a one-way function, wherein the possibility that malicious code or the like reads an authenticator is reduced and false authentication using a falsely read authenticator is prevented.

SUMMARY OF THE INVENTION

An authentication system of the invention comprises:
authenticator accepting period detection means for detecting an authenticator accepting period during which inoperativeness of unauthenticated programs is guaranteed;
program executing means for executing a predetermined program and for transmitting an authenticator only when receiving an authenticator transmittal request during the authenticator accepting period; and
authentication means for determining whether to authenticate the program executing means by computing a one-way function value based on the authenticator received from the program executing means and by comparing the one-way function value with a stored value for the program executing means.

Authentication may be performed during any period when inoperativeness of unauthenticated programs is guaranteed. Therefore, the authenticator accepting period is not limited to a boot period which will be described below. That is, authentication is not limited within a period starting from generation of a system reset, and not limited within a period ending at activation of an OS.

While a password is generally fixed, the authenticator is not limited to such a fixed password but may vary for each time of authentication. For example, suppose that bivariate functions E (K, P) and D (K, Q) are defined, wherein each function is an inverse function for the other function when K is fixed (i.e., P=D (K, E (K, P))). The authentication means that performs authentication specifies an arbitrary "challenge" K and informs the program executing means to be authenticated of K along with a request for a password. The program executing means returns a "response" Q=E (K, P) instead of P itself to the authentication means. The authentication means computes P' according to P'=D (K, Q). This technique is a variation of a known technique called "challenge-response". The authentication means computes a one-way function value H (P') corresponding to P' and compares the computed one-way function value H (P') with a stored one-way function value H (P) obtained in advance from genuine P to determine whether to authenticate the program executing means. The authentication means may arbitrarily select the value of K, depending on how the value of Q changes. The concept of the authenticator includes such a varying authenticator as Q.

The authentication system of the invention is incorporated in an electrical apparatus such as a PC (Personal Computer). Besides the PC, the electrical apparatus incorporating the authentication system can include such apparatus as a PDA (Personal Digital Assistant), a mobile phone, certain home electrical appliances, a game machine, an industrial robot, a vending machine, an ATM, a copier, a fax machine, and so on. The concept of the electrical apparatus to which the authentication system of the invention is applied includes all electrical apparatus that have one or more processors and executes a program. The authentication means compares the one-way function value computed based on the authenticator received from the program executing means with the stored value for the program executing means, rather than comparing the authenticator itself received from the program executing means with the stored value. Therefore, even if the stored value is leaked from the authentication means, false authentication of malicious code that uses the data leaked from the authentication means is effectively avoided. In addition, the program executing means has no need to implement a computing algorithm such as public key cryptography algorithm, thereby simplifying its structure.

In one aspect of the invention, code of the program executed by the program executing means is rewritable, and/or the authentication means cannot read the code.

If the code of the program executing means is rewritable, the risk that malicious code rewrites it increases. For such rewritable code of the program executing means, an authenticator of the program executing means or a seed required for generating the authenticator is generally stored in rewritable memory along with software code, rather than in an electrical circuit. If the malicious code rewrites the code of the program executed by the program executing means, the authenticator or the seed required for generating the authenticator is also lost or modified. Therefore, the program executing means may fail to transmit the genuine authenticator. Generally, a rewritable nonvolatile storage element may be rewritten on a block basis (e.g., a plurality of bytes, such as 128 bytes per block). Therefore, in a block including the authenticator, preserving the authenticator and rewriting only other code portions is difficult. In addition, finding the block including the authenticator requires a considerable amount of information about a memory structure and so on. Thus, if the code of the program executing means is rewritten by the malicious code, the program executing means may fail to transmit the genuine authenticator and may not be authenticated by the authentication means.

The authentication means that performs authentication may read the program code from the program executing means to be authenticated and determine whether the program executing means is genuine, i.e., whether to authenticate the program executing means, based on the content of the program code. However, if the program code cannot be read, it is difficult to perform authentication in such a manner. This increases the significance of performing authentication based on the authenticator transmitted by the program executing means during the authenticator accepting period. If the invention is applied to a PC such as a notebook PC, the program executing means may be an embedded controller that has a program such as a power management program for power-saving mode of the PC, and the authentication means is typically executed by a CPU of the PC. Then, the program code of the embedded controller cannot be read by the CPU of the PC. Besides the controller having the power management program for power-saving mode of the PC, examples of the embedded controller corresponding to the program executing means include a network controller, a hard disk drive controller, and a CD-ROM drive controller. As used herein, the "embedded controller" means a controller having a dedicated processor in it.

The authenticator accepting period is, for example, included in a period from a system reset to activation of an operating system (OS) of the authentication system (activation means that the OS becomes operable), which will be called a "boot period" hereafter. According to TCPA (Trusted Computing Platform Alliance: for details, see www.trusted-pc.org), which is an open standard for trust and security of computing platforms, predetermined programs are read, executed, and authenticated sequentially in a predetermined chain during the boot period. Specific order in this chain is as follows: a BIOS boot block, a BIOS (Basic Input/Output System), an OS loader, and an OS (Operating System). The BIOS boot block having its code read first is stored in ROM that is hard to rewrite, and it serves as a Core Root of Trust for Measurement. Therefore, the BIOS boot block has been authenticated at any point. According to a preferred authentication system, during the boot period, the BIOS boot block is treated as having being authenticated, and an authentication chain is set for predetermined programs including the BIOS boot block, in which each program is authenticated by the preceding authenticated program. The authentication means implements a program involved in the authentication chain to perform authentication.

Preferably, the program executing means has hardware, the hardware having a function of enabling and disabling transmission of an electric signal of the authenticator of the program executing means from the program executing means, and the hardware further enabling the program executing means to transmit the electric signal of the authenticator of the program executing means from the point of initial detection of a system reset signal. The system reset signal is generated for starting the system (including restarting) such as at power-on. Because the hardware of the program executing means enables and disables transmission of the authenticator of the program executing means from the program executing means, and detects the system reset signal as the start of the boot period, the possibility that malicious code falsely obtain the authenticator from the program executing means further decreases.

The hardware preferably disables the program executing means from transmitting the authenticator or transmits an error signal instead of the authenticator in response to input of a predetermined external command signal. "External" typically means originating from the authentication means. The concept of the "predetermined external command signal" includes a signal relevant to a single command, as well as a signal relevant to a particular sequence of commands, and a signal relevant to a set of particular commands among a plurality of commands. The program executing means is typically a firmware element. The firmware element may incorporate a processor for executing its firmware, or may not incorporate the processor but have it connected externally.

The authenticator of the program executing means is preferably different for each version of the program implemented by the program executing means, each type of an electrical apparatus that incorporates the authentication system, and/or each electrical apparatus that incorporates the authentication system. By having the authenticator different for each version of the program implemented by the program executing means, each type of an electrical apparatus that incorporates the authentication system, and/or each electrical apparatus that incorporates the authentication system, the authenticator may also be used as an identifier for identifying the version of the program, the type of the electrical apparatus, and/or the electrical apparatus.

According to the invention, a firmware device that implements firmware comprises: an authenticator transmitter for transmitting an authenticator; a detector for detecting a period during which inoperativeness of external unauthenticated programs is guaranteed (called an "authenticator accepting period" hereafter) based on a predetermined electrical signal that is externally input; and a transmission controller for enabling the authenticator transmitter to transmit the authenticator only during the authenticator accepting period. The transmission controller preferably disables the authenticator transmitter from transmitting the authenticator or transmits an error signal instead of the authenticator in response to input of a predetermined external command signal. Further, it preferably disables the authenticator transmitter from transmitting the authenticator when receiving notification of having been authenticated from an authenticating apparatus.

The firmware device may incorporate a processor for executing its firmware, or may have the processor connected externally.

An electrical apparatus of the invention comprises: an authenticating component; and an authentication object component cooperating with a predetermined cooperative component after being authenticated by the authenticating component. The authentication object component comprises control code at least part of which cannot be accessed from outside of the authentication object component. The authenticating component transmits an authenticator transmittal request command to the authentication object component. The authentication object component transmits an authenticator in response to the authenticator transmittal request from the authenticating component.

Since the authentication object component includes code that is hard to read from outside, it is difficult for the authenticating component to authenticate by reading and validating the code. In the electrical apparatus of the invention, this difficulty is addressed by the authenticating component transmitting a predetermined command to the authentication object component and determining whether to authenticate the authentication object component based on a response for the command from the authentication object component.

Another electrical apparatus of the invention comprises: an authenticating component; an authentication object component cooperating with a predetermined cooperative component after being authenticated by the authenticating component; and a supervisory control component implementing a control sequence (called an "supervisory control sequence" hereafter) for supervising and controlling a plurality of components including the authenticating component and the authentication object component. The supervisory control sequence is activated in response to a signal for powering up the electrical apparatus, and the authenticating component authenticates the authentication object component before the supervisory control sequence is activated.

The supervisory control sequence may be an OS, for example. Authenticating the authentication object component before the supervisory control sequence is activated prevents false code from falsely obtaining the authenticator.

The supervisory control sequence may be an OS of a PC, for example. In an electrical apparatus, processors and programs provided in the apparatus for performing respective specific functions or processing may be organized hierarchically. Higher processors and programs supervise lower processors and programs, thereby achieving systematic or consistent control of the electrical apparatus as a whole. Authentication is performed before the supervisory control sequence is activated, i.e., before a malicious program or the like becomes operable, which results in reducing risk such as authenticator leakage.

An authentication method of the invention comprises:
  an authenticator accepting period detecting step for detecting an authenticator accepting period during which inoperativeness of unauthenticated programs is guaranteed;
  an authenticator transmitting step in which program executing means for executing a predetermined program transmits an authenticator only when receiving an authenticator transmittal request during the authenticator accepting period; and
  an authentication determining step in which authentication means determines whether to authenticate the program executing means by computing a one-way function value based on the authenticator received from the program executing means and by comparing the one-way function value with a stored value for the program executing means.

Any combination of the following technical features may be added to the authentication method of the invention.
  Code of the program executed by the program executing means is rewritable and/or the authentication means cannot read the code.
  The authenticator accepting period is defined in a period from a system reset to activation of an operating system of the authentication method (called a "boot period" hereafter).
  During the boot period, a BIOS boot block is treated as having been authenticated, and an authentication chain is set for predetermined programs including the BIOS boot block, in which each program is authenticated by the preceding authenticated program. The authentication means performs the authentication determining step by implementing a program involved in the authentication chain to perform authentication.
  To perform the authenticator transmitting step, the program executing means has hardware, the hardware having a function of enabling and disabling transmission of the authenticator of the program executing means from the program executing means, and the hardware further enabling the program executing means to transmit the authenticator of the program executing means from the point of initial detection of a system reset signal.
  To perform the authenticator transmitting step, the hardware disables the program executing means from transmitting the authenticator or transmits an error signal instead of the authenticator in response to input of a predetermined external command signal.
  The program executing means is a firmware element.
  The authenticator of the program executing means is different for each version of the program implemented by the program executing means, each type of an electrical apparatus that incorporates the authentication method, and/or each electrical apparatus that incorporates the authentication method.

According to the invention, program executing means to be authenticated transmits an authenticator during a period when inoperativeness of unauthenticated programs is guaranteed. This can effectively prevent malicious code from falsely reading an authenticator, or being falsely authenticated using a falsely obtained authenticator, or impersonating an authenticating entity.

DETAILED DESCRIPTION

Now, embodiments of the invention will be described with reference to the drawings.

Figure 1:
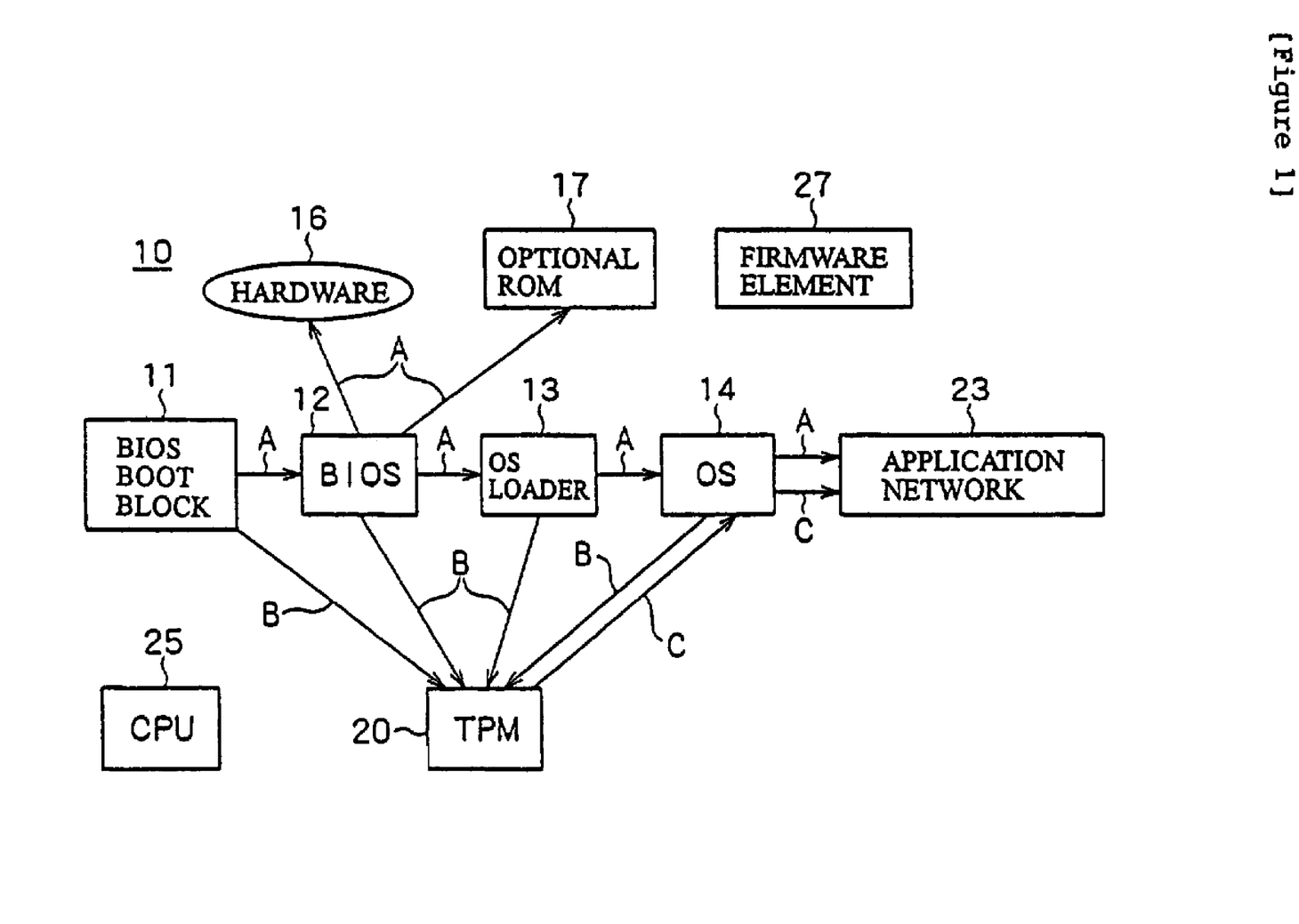
FIG. 1 describes integrity measurement in an application of TCPA to a PC.

FIG. 1 describes integrity measurement in an application of TCPA (Trusted Computing Platform Alliance: an open standard for trust and security of computer platforms) to a PC (Personal Computer) 10. In FIG. 1, reference character A denotes authentication measurement, reference character B denotes storage of the authentication result, and reference character C denotes reporting. When a system reset is generated such as at power-on, boot-up starts. During the boot-up, a BIOS boot block 11, a BIOS 12, an OS loader 13, and an OS 14 are executed in this order. The chain of reading and executing the BIOS boot block 11, the BIOS 12, the OS loader 13, and the OS 14 is also the chain of authentication. Each program is authenticated by the preceding authenticated program and then determines whether to authenticate the program that is read next. That is, the BIOS 12, the OS loader 13, and the OS 14 are authenticated by the BIOS boot block 11, the BIOS 12, and the OS loader 13, respectively. Each program is authenticated by an authenticating entity verifying the content of the program. The OS 14 authenticates an application network 23. The BIOS boot block 11 resides in ROM, and since it is impossible for malicious code to rewrite the BIOS boot block 11, the BIOS boot block 11 is essentially authenticated code and a basic element of TCPA, and serves as the Core Root of Trust for Measurement. The BIOS 12 is responsible for authentication of the OS loader 13, as well as certain hardware 16 and optional ROM 17. The authentication results at the BIOS boot block 11, the BIOS 12, the OS loader 13, and the OS 14 are stored in a TPM (Trusted Platform Module) 20. The TPM, a basic element of TCPA, is a chip having functions of RTS (Root of Trust for Storage) and RTR (Root of Trust for Reporting) The OS 14 receives a report on the authentication results from the TPM 20. In the PC 10, the period from a system reset to activation of the OS 14 will be called a "boot period". In FIG. 1, the BIOS boot block 11, the BIOS 12, the OS loader 13, the OS 14, and the application network 23 are executed by a main CPU 25 of the PC 10. If malicious code such as a computer virus invades the PC 10, various data (including files) may be rewritten or deleted against a user's intention. A firmware element 27 is, for example, an embedded controller that incorporates a processor along with firmware. For example, the embedded controller performs power management in power-saving mode of the PC 10.

Since the CPU 25 cannot read the firmware written in the firmware element 27, it is difficult for the CPU 25 to determine whether to authenticate the firmware 27 by reading and verifying the content of the code of the firmware element 27. Therefore, the firmware element 27 must be authenticated differently from the BIOS 12, the OS loader 13, and the OS 14.

Figure 2:
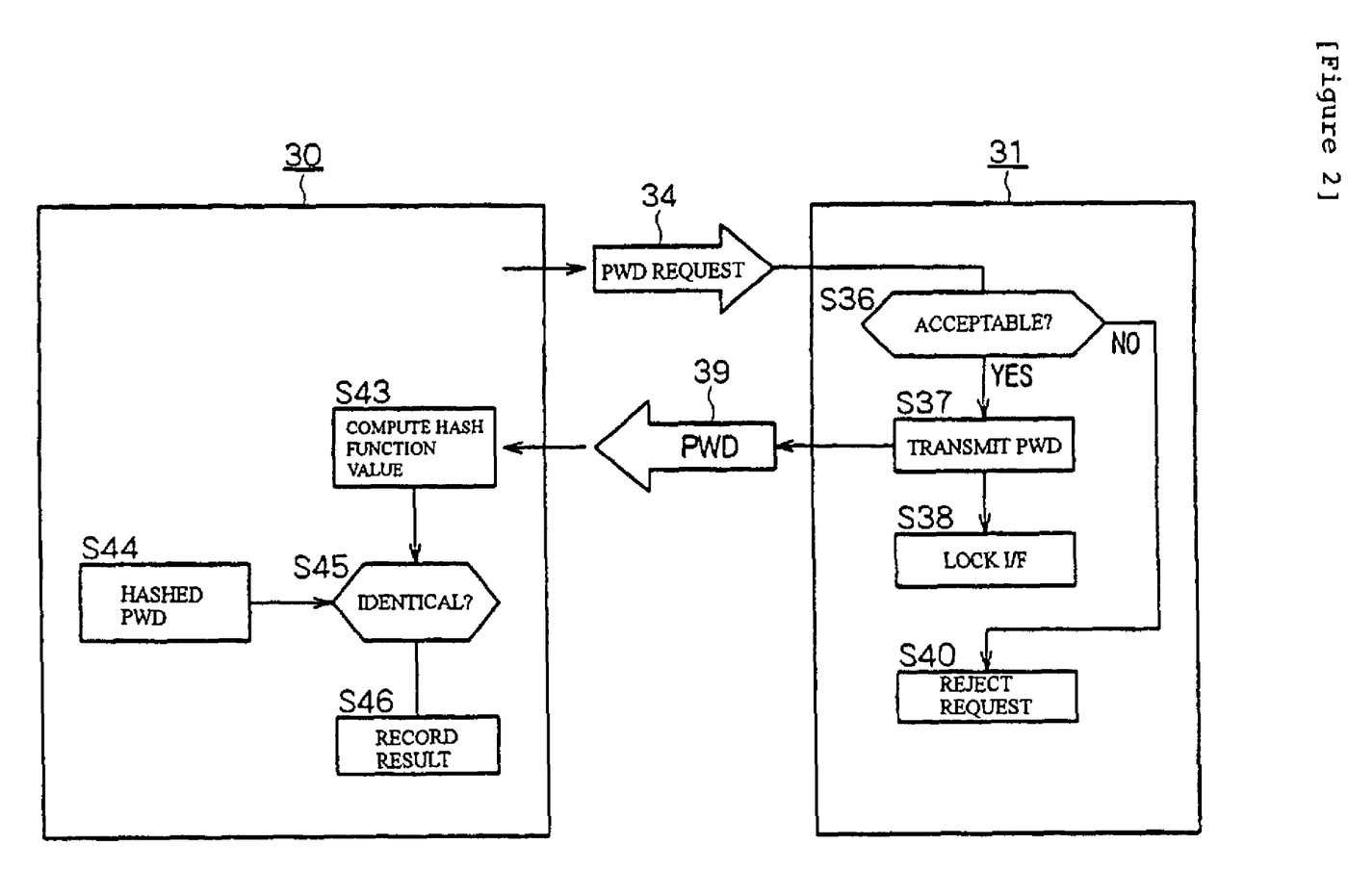
FIG. 2 describes an authentication mechanism provided in the PC.

FIG. 2 describes an authentication mechanism provided in the PC 10. An authenticating entity 30 is a program that operates as an authenticated program during the boot period in the PC 10. It may be inserted appropriately in the authentication chain from the BIOS boot block 11 to the OS 14 in FIG. 1, or any one of the BIOS boot block 11, the BIOS 12, the OS loader 13, and the OS 14 may serve as the authenticating entity 30. In the boot period after the authenticating entity 30 is authenticated, the authenticating entity 30 transmits a PWD (password) Request 34 to an authentication object 31. When the authentication object 31 receives the PWD Request 34, it determines whether it is in a period when it can accept the PWD Request (S36). If the determination in S36 results in NO, the PWD Request 34 is rejected (S40). If the determination results in YES, a PWD 39 is transmitted as an authenticator (S37), and then an interface (I/F) is locked (S38). The PWD 39 may be transmitted more than once, i.e., for each time the PWD Request is received, as long as the authentication object 31 is in the period when it can accept the PWD Request 34. However, for security, it is better to minimize the times the PWD is transmitted. The authenticating entity 30 has a one-way function of a computing algorithm such as SHA1 or MD5 as a hash function, and uses it in S43 to compute a hash function value of the PWD 39 received from the authentication object 31. The authenticating entity 30 also has a hash function value of the PWD of the authentication object 31 stored in advance in association with the authentication object 31. In S44, the authenticating entity 30 calls the stored hash function value, and in S45, it compares the value computed in S43 with the stored hash function value called in S44. If the values are identical, the authentication object 31 is regarded as genuine and is authenticated. Otherwise, the authentication object 31 is regarded as false and is unauthenticated. The comparison result is recorded in predetermined memory in S46. If the authentication object 31 is unauthenticated, (a) the authentication object 31 may be forced to be powered off so as not to operate, or (b) the PC 10 may display a message on a screen notifying that the authentication object 31 is unauthenticated and leave the user to deal with the unauthenticated situation.

Figure 3:
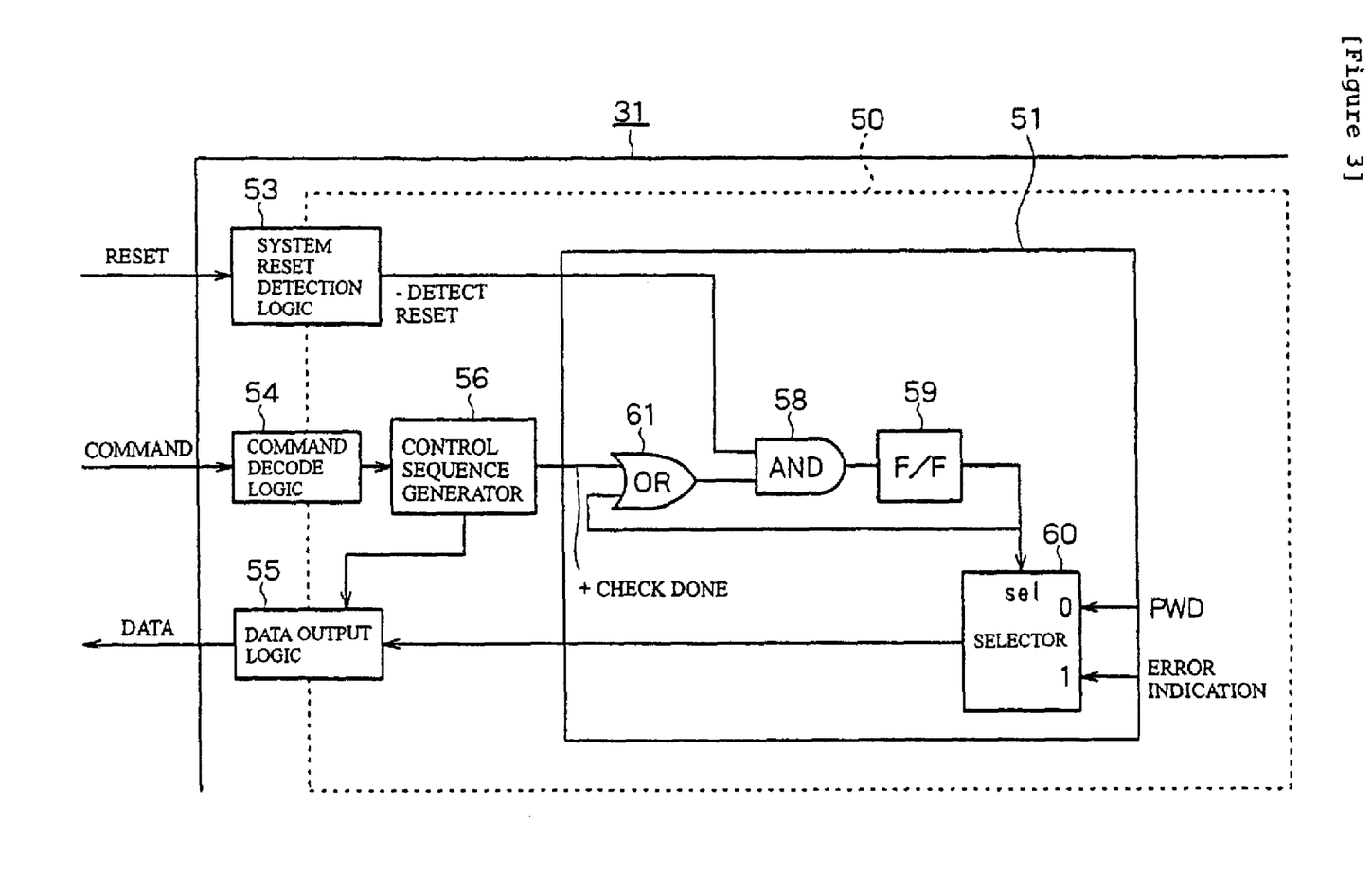
FIG. 3 is a schematic diagram of a mechanism provided in an authentication object for controlling output of a password from the authentication object.

FIG. 3 is a schematic diagram of a mechanism provided in the authentication object 31 for controlling output of the PWD (password) from the authentication object 31. For example, the authentication object 31 is an embedded controller, which includes a Lock Logic 51 implemented as hardware. The configuration within a dashed-line frame 50 in FIG. 3 is implemented as hardware, but may also be implemented as a firmware element. At power-on of the PC 10 or restart of the OS, a system reset signal is generated, which is detected by a System Reset Detection Logic 53. The output of the System Reset Detection Logic 53 is in negative logic. As the System Reset Detection Logic 53 detects the reset signal, an AND circuit 58 in the Lock Logic 51 outputs "0", then a flip-flop circuit 59 is reset, and then a selector 60 outputs the PWD at a 0-side input to a Data Output Logic 55. Typically, the PWD and an error indication are always on standby at the 0-side input and a 1-side input of the selector 60, respectively. Alternatively, the authentication object 31 may hold a seed of the PWD and generate the PWD from the seed with a deterministic logic to supply it to the 0-side input of the selector 60 as needed. On cessation of the system reset signal, the output of the System Reset Detection Logic 53 immediately returns to "1". However, since the output "0" of the flip-flop circuit 59 is being input to the other input of the AND circuit 58 via an OR circuit 61, the flip-flop circuit 59 is kept reset, and the selector 60 continues outputting the PWD. On the other hand, a Command Decode Logic 54 decodes external commands, which are sent to a control sequence generator 56. A Check Done signal that is output from the control sequence generator 56 is in a positive logic. The commands that are input to the Command Decode Logic 54 include (a) a "Read PWD" command that serves to Read the PWD and to Lock, and (b) a "Read PWD" command and a separate "Lock" command. In the case of (a), when the Command Decode Logic 54 receives the "Read PWD", the control sequence generator 56 enables output of the Data Output Logic 55. After the PWD is output, further output of Data Output Logic 55 is disabled. Then, the control sequence generator 56 activates the "Check Done" signal, which causes the flip-flop circuit 59 to be set. Thereafter, the output of the selector 60 is fixed at the error indication side. In the case of (b), when the Command Decode Logic 54 receives the "Read PWD", the control sequence generator 56 enables output of the Data Output Logic 55. On completion of the output, further output of Data Output Logic 55 is disabled. When the Command Decode Logic 54 receives the "Lock", the control sequence generator 56 activates the "Check Done" signal. Thereafter, the output of the selector 60 is fixed at the error indication side. In this manner, the output of the PWD from the Data Output Logic 55 is limited to the period from generation of the system reset signal to the first PWD transmission or to the reception of the Lock signal.

Figure 4:
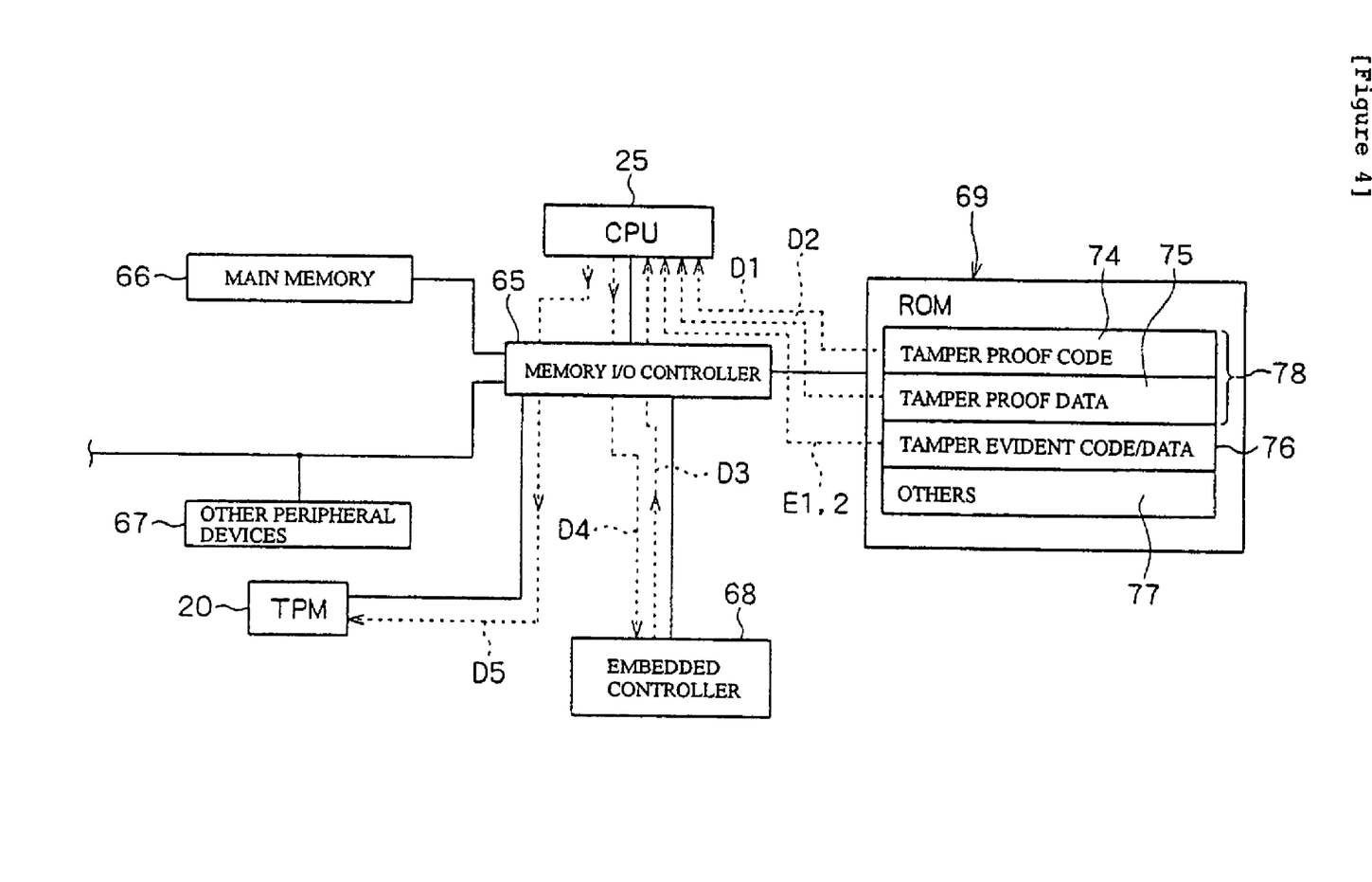
FIG. 4 shows how various signals are flowing in hardware circuitry of the PC in an authentication system for an embedded controller.

FIG. 4 shows how various signals are flowing in hardware circuitry of the PC 10 in an authentication system for an embedded controller 68. The embedded controller 68 is an example of the authentication object 31 in FIG. 2. The CPU 25 is connected to the TPM 20 representing various memory devices, main memory 66, other peripheral devices 67, the embedded controller 68, and ROM 69 via a memory I/O controller 65. The ROM 69 includes tamper proof code 74 incapable of being tampered with (not rewritable), tamper proof data 75 incapable of being tampered with (not rewritable), tamper evident code/data 76, and others 77. The tamper proof code 74 and the tamper proof data 75 forms a core RTM 78. The CPU 25 firstly reads an authentication program from the tamper proof code 74 (D1) and reads a hash function value of a password of the embedded controller 68 from the tamper proof data 75 (D2). Then, the CPU 25 receives a password of the embedded controller 68 from the embedded controller 68 (D3) and computes a hash function value of the received password to compare it with the hash function value read in D2. If the two values are identical, the embedded controller 68 is regarded as genuine and is authenticated. Otherwise, the embedded controller 68 is regarded as false and is unauthenticated. If the CPU 25 authenticates the embedded controller 68, it transmits a Lock command to the embedded controller 68 (D4). The CPU 25 also records the authentication result for the embedded controller 68 in the TPM 20 (D5). Reference characters E1 and E2 means that the code and data in D1 and D2 are used after it is ensured that they have not been tampered with.

Figure 5:
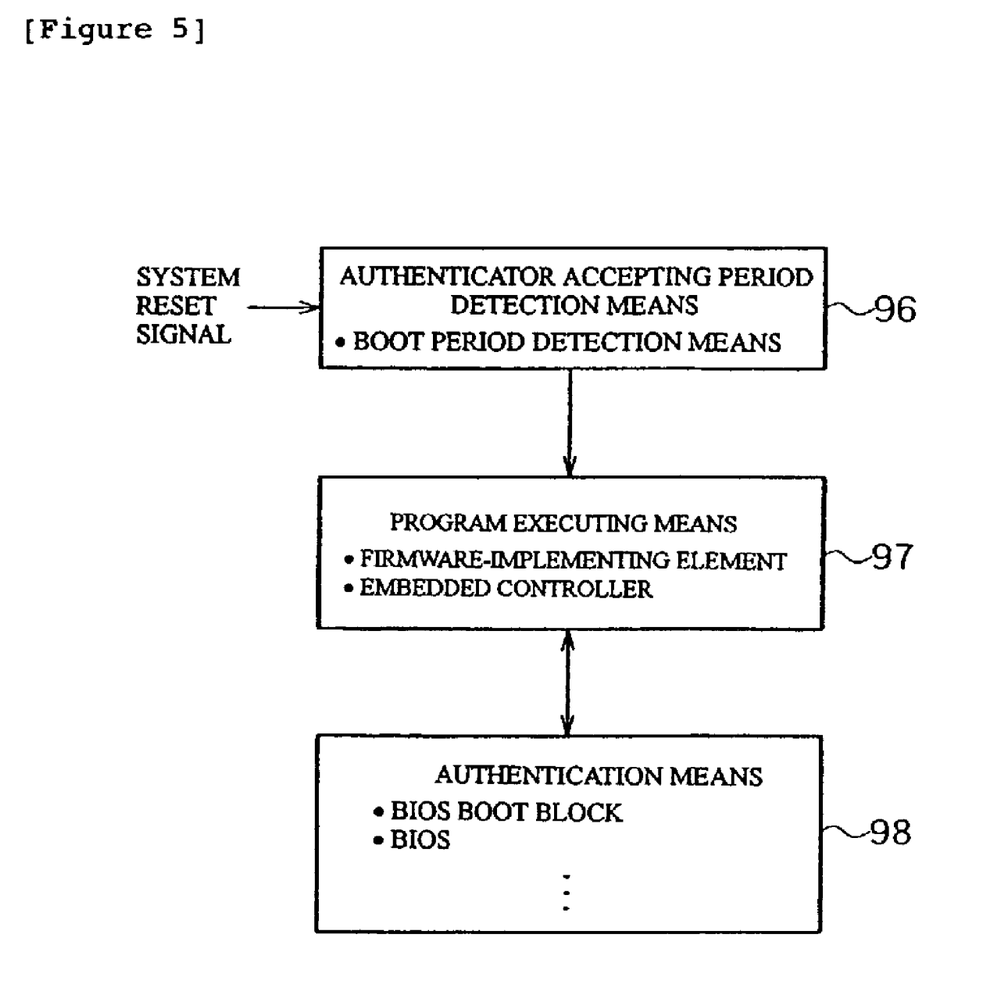
FIG. 5 is a functional block diagram of an authentication system.

FIG. 5 is a functional block diagram of an authentication system. Each block is equipped with a predetermined program and is a means to execute a function corresponding to the program. An authenticator accepting period detection means 96 detects an authenticator accepting period in the authentication system. The authenticator accepting period is, for example, a period starting from a generation of a system reset signal and ending with an activation of an OS (activate: an OS is read to create an operative status), that is to say a boot period. A boot period detection means for detecting a boot period of a PC 10 is one of the particular embodiments of the authenticator accepting period detection means 96. A program executing means 97 is implemented with a control code, a reading-out of which is difficult from a CPU 25 (in FIG. 1). Particular embodiments of the program executing means 97 are, for example, a firmware element and an embedded controller. Incidentally, a processor is incorporated into the embedded controller but is not necessarily incorporated into the firmware element. The program executing means 97 recognizes the authenticator accepting period based on information being inputted from the authenticator accepting period detecting means 96. The program executing means 97 transmits a password to an authentication means 98 only during the authenticator accepting period, for example, only once. The authentication means 98 transmits a password transmittal request to the program executing means 97 and computes a hash function value to the password being transmitted by the program executing means 97. Then, the authentication means 98 compares the computed value with a data being held beforehand as a hash function value of the program executing means 97. When both values are identical, the authentication means 98 authenticates the program executing means 97. When the values are not identical, the authentication means 98 rejects the authentication of the program executing means 97. Particular examples of the authentication means 98 are a BIOS boot block 11 and a BIOS 12 in FIG. 1 etc. and a code for authentication of the program executing means 97 may be inserted into codes of the BIOS boot block 11 and the BIOS 12. The computation of a hash function value greatly augments a workload of the processor. In the present authentication system, however, the program executing means 97 is not required to compute a hash function value. Further, all data being held by the authentication means 98 may be read by code in bad faith that comes from outside of the authentication means 98 such as a computer virus and a computer worm; however, the authentication means 98 doesn't hold the password itself of the program executing means 97 but hold a hash function value to the password of the program executing means 97. Thus, even if the code in bad faith succeeds in reading out of the hash function value, it is not possible to obtain the password which is a basis of the hash function value. Therefore, the authentication of the code in bad faith pretending to be the authenticator accepting period detecting means 96 is prevented. During the authenticator accepting period, such as a boot period, no program except authenticated programs can be run on the CPU 25 and a password transmittal by the program executing means 97 is done only during the authenticator accepting period. Therefore, reading out of the password of the program executing means 97 by the code in bad faith which may run on the CPU 25 is prevented.

Figure 6:
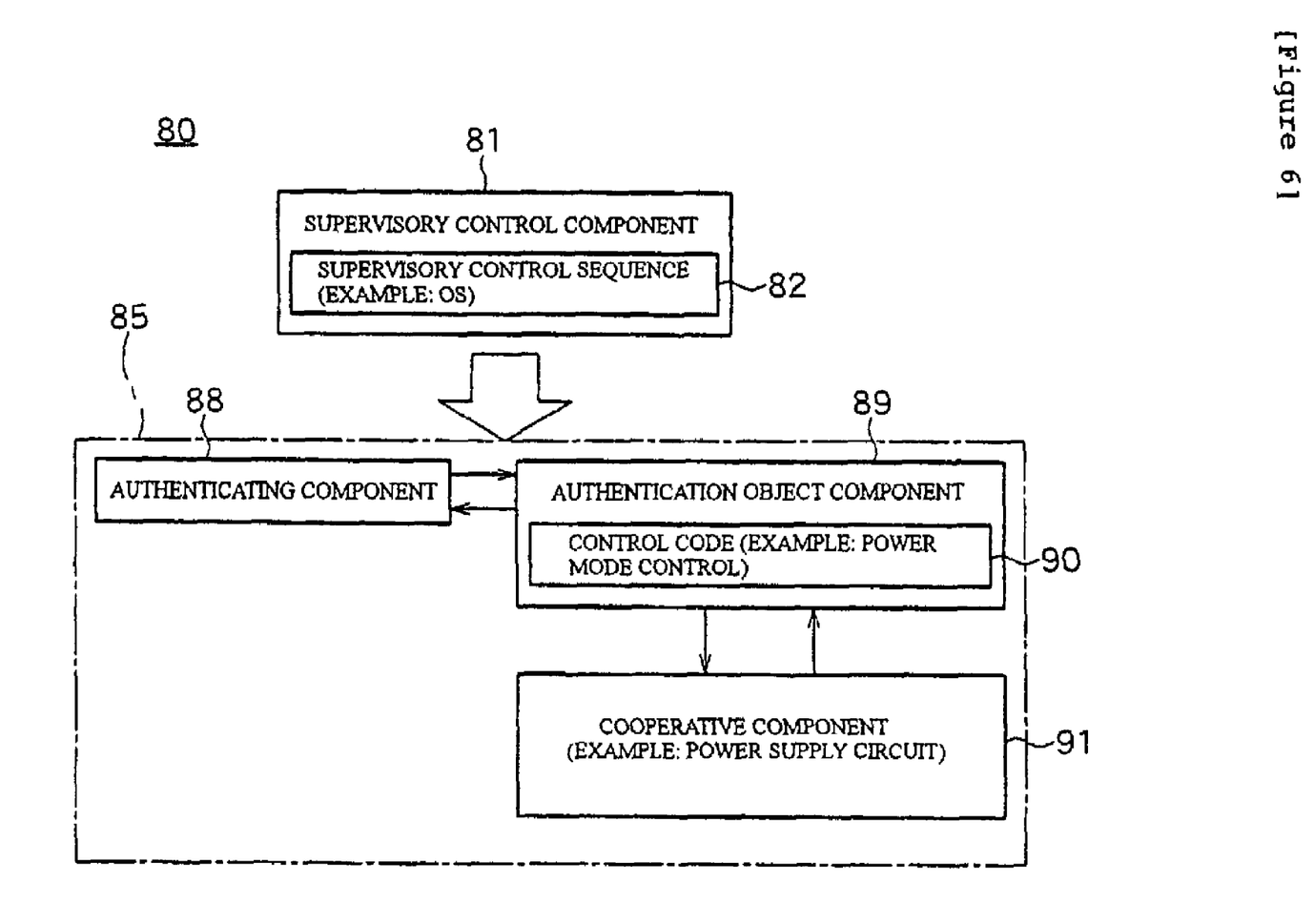
FIG. 6 is a block diagram of an electrical apparatus that incorporates an authentication system.

FIG. 6 is a block diagram of an electrical apparatus 80 that incorporates an authentication system. Examples of the electrical apparatus 80 that incorporates the authentication system include the PC 10, as well as an industrial robot, a vending machine, an ATM (Automated-Teller Machine), a copier, and a game machine. Each component may be means that implements a predetermined program to provide a function corresponding to the program, or may be hardware such as an electrical circuit. A supervisory control component 81 may be a component that implements a supervisory control sequence such as an OS. When the electrical apparatus 80 includes a plurality of processors and/or programs organized hierarchically, higher processors and/or programs supervise lower processors and/or programs. Although the supervisory control component 81 may not necessarily be the highest component of the electrical apparatus 80, it must be higher than all processors and/or programs included in a supervised-controlled component group 85. The supervisory control component 81 has a supervisory control sequence 82 such as an OS. The supervised-controlled component group 85 includes an authenticating component 88, an authentication object component 89, and a cooperative component 91. Like the authenticating means 98, the authenticating component 88 has, for example, a BIOS, a BIOS boot block, and so on. The authentication object component 89 has control code 90 that cannot be read from outside. An example of the control code 90 is code that controls power mode of the electrical apparatus 80 based on the usage of the electrical apparatus 80 or a user command. For example, if the electrical apparatus 80 is a notebook PC 10, power mode is controlled to switch to full power, stand-by, suspend, power off, or other modes based on the remaining amount of the battery or the usage of the equipped devices. If the control code 90 is code for power control, the cooperative component 91 may a power supply circuit, for example. The cooperative component 91 cooperates with the authentication object component 89 to control the electrical apparatus 80 in a predetermined manner. The authenticating component 88 cannot read at least part of the control code 90 of the authentication object component 89, and therefore cannot determine whether to authenticate the authentication object component 89 by reading certain code portion from the control code 90 and verifying it.

The authenticating component 88 authenticates the authentication object component 89 during a boot period, for example, but it is not limited to this period. The authentication object component 89 responds to an authenticator transmittal request received from the authenticating component 88 to transmit an authenticator. The authenticating component 88 determines whether the authentication object component 89 is genuine based on the authenticator transmitted from the authentication object component 89. If the authentication object component 89 is determined to be genuine, it is authenticated. Once authenticated by the authenticating component 88, the authentication object component 89 cooperates with the cooperative component 91 to control the electrical apparatus 80 in a predetermined manner.

We claim:

1. An electrical apparatus comprising:
an authenticating component, wherein the authentication component is an embedded controller that controls output of a password from an authentication object, and wherein the authentication object is composed of:
a Lock Logic that includes an OR gate, an AND gate, a flip-flop circuit (F/F), and a selector, wherein an output of the OR gate is coupled to a first input of the AND gate, an output of the AND gate is coupled to an input of the F/F, and an output of the F/F is coupled to a select input of the selector and to the input of the AND circuit via a first input of the OR circuit;
a System Reset Detection Logic that detects a start of an Operating System (OS) in the electrical apparatus, wherein a reset detection output of the System Reset Detection Logic is coupled to a second input of the AND gate;
a Command Decode Logic coupled to a Control Sequence Generator, wherein the Command Decode Logic decodes encoded external commands, wherein decoded external commands are sent to the control sequence generator, and wherein the encoded external commands include a "Read PWD" command that serves to Read the a password (PWD) and a "Lock" command that locks a Data Output Logic that has an input that is coupled to an output of the selector, wherein the reset signal to the System Reset Detection Logic and the "Read PWD" cause a password to be output from the selector to the data output logic, and wherein the "Lock" command causes the data output logic to be locked after the data output logic outputs the password once, and wherein the "Lock" command causes the control sequence generator to activate a "Check Done" signal that causes the flip-flop circuit to be set such that selector outputs an error indication, and wherein on cessation of the system reset signal, the output of the System Reset Detection Logic immediately changes state such that the "Check done" signal causes both inputs to the AND circuit to cause error indication to be output from the selector to the data output logic, wherein the output of the PWD from the Data Output Logic is limited to a time period that starts with a generation of the system reset signal and ends with either a first PWD transmission or a reception of the "Lock" signal;
an authentication object component cooperating with a predetermined cooperative component after being authenticated by the authenticating component; and
a supervisory control component implementing a supervisory control sequence for supervising and controlling a plurality of components including the authenticating component and the authentication object component, wherein the supervisory control sequence is activated in response to a signal for powering up the electrical apparatus, and the authenticating component authenticates the authentication object component before the supervisory control sequence is activated.

2. The electrical apparatus of claim 1, wherein the PWD and the error indication are always on standby at the 0-side input and a 1-side input of the selector, respectively.

3. The electrical apparatus of claim 1, wherein the authentication object holds a seed of the PWD and generates the PWD from the seed with a deterministic logic to supply it to the 0-side input of the selector as needed.

4. The electrical apparatus of claim 1, wherein the supervisory control sequence is activated in response to a signal for powering up the electrical apparatus.

5. A firmware device that implements firmware comprising:
an authenticating component, wherein the authentication component is an embedded controller that controls output of a password from an authentication object, and wherein the authentication object is composed of:
a Lock Logic that includes an OR gate, an AND gate, a flip-flop circuit (F/F), and a selector, wherein an output of the OR gate is coupled to a first input of the AND gate, an output of the AND gate is coupled to an input of the F/F, and an output of the F/F is coupled to a select input of the selector and to the input of the AND circuit via a first input of the OR circuit;
a System Reset Detection Logic that detects a start of an Operating System (OS) in the electrical apparatus, wherein a reset detection output of the System Reset Detection Logic is coupled to a second input of the AND gate;
a Command Decode Logic coupled to a Control Sequence Generator, wherein the Command Decode Logic decodes encoded external commands, wherein decoded external commands are sent to the control sequence generator, and wherein the encoded external commands include a "Read PWD" command that serves to Read the a password (PWD) and a "Lock" command that locks a Data Output Logic that has an input that is coupled to an output of the selector, wherein the reset signal to the System Reset Detection Logic and the "Read PWD" cause a password to be output from the selector to the data output logic, and wherein the "Lock" command causes the data output logic to be locked after the data output logic outputs the password once, and wherein the "Lock" command causes the control sequence generator to activate a "Check Done" signal that causes the flip-flop circuit to be set such that selector outputs an error indication, and wherein on cessation of the system reset signal, the output of the System Reset Detection Logic immediately changes state such that the "Check done" signal causes both inputs to the AND circuit to cause error indication to be output from the selector to the data output logic, wherein the output of the PWD from the Data Output Logic is limited to a time period that starts with a generation of the system reset signal and ends with either a first PWD transmission or a reception of the "Lock" signal;
an authentication object component cooperating with a predetermined cooperative component after being authenticated by the authenticating component; and
a supervisory control component implementing a supervisory control sequence for supervising and controlling a plurality of components including the authenticating component and the authentication object component, wherein the supervisory control sequence is activated in response to a signal for powering up the electrical apparatus, and the authenticating component authenticates the authentication object component before the supervisory control sequence is activated.

6. The firmware device of claim 5, wherein the PWD and the error indication are always on standby at the 0-side input and a 1-side input of the selector, respectively.

7. The firmware device of claim 5, wherein the authentication object holds a seed of the PWD and generates the PWD from the seed with a deterministic logic to supply it to the 0-side input of the selector as needed.

* * * * *